(12) United States Patent
Mochizuki et al.

(10) Patent No.: US 7,354,340 B2
(45) Date of Patent: Apr. 8, 2008

(54) LOUVER APPARATUS

(75) Inventors: Chihiro Mochizuki, Shizuoka (JP); Kazuhisa Yamamoto, Shizuoka (JP)

(73) Assignee: Nihon Plast Co., Ltd., Shizuoka (JP)

( * ) Notice: Subject to any disclaimer, the term of this patent is extended or adjusted under 35 U.S.C. 154(b) by 0 days.

(21) Appl. No.: 11/168,429

(22) Filed: Jun. 29, 2005

(65) Prior Publication Data

US 2006/0073781 A1 Apr. 6, 2006

(30) Foreign Application Priority Data

Jun. 30, 2004 (JP) ............................. 2004-194597

(51) Int. Cl.
*B60H 1/34* (2006.01)
(52) U.S. Cl. ..................................... 454/152
(58) Field of Classification Search ................. 454/152; 160/292
See application file for complete search history.

(56) References Cited

U.S. PATENT DOCUMENTS 3,547,152 A 12/1970 Hess
3,783,768 A 1/1974 Caming et al.

FOREIGN PATENT DOCUMENTS

| JP | 57-73539 U | | 5/1982 |
| JP | 06-058617 | * | 4/1994 |
| JP | 2004-262352 A | | 9/2004 |
| JP | 2005-29084 A | | 2/2005 |

* cited by examiner

*Primary Examiner*—Steven McAllister
*Assistant Examiner*—Helena Kosanovic
(74) *Attorney, Agent, or Firm*—Sughrue Mion, PLLC

(57) ABSTRACT

A louver apparatus includes a case member, a connecting member, and a louver pivotally secured to the case member, including a shaft portion including a shaft body being in the form of a substantially cylindrical shape, and a head portion being in the form of a substantially regular polygon, and being located at a tip end portion of the shaft body. At least a part of the head portion protruding radially from the shaft body. The connecting member includes an axial hole being in the form of a substantially regular polygon. The head portion is arranged to pass through the axial hole only at predetermined positions, and to be held not to pass through the axial hole at positions other than the predetermined positions.

5 Claims, 5 Drawing Sheets

LOUVER APPARATUS

BACKGROUND OF THE INVENTION

The present invention relates to a louver apparatus equipped in a blowout port of an automobile air conditioner.

Louver apparatuses equipped in the blowout ports of automobile air conditions and used as wind direction-adjusting units have been heretofore known. A louver apparatus of this kind includes a cylindrical casing body, for example. A plurality of louvers are rotatably pivoted inside the casing body. Links are connected with the louvers. The louvers are pivoted interlockingly by the links to change the direction of wind.

With respect to a structure for mounting louvers to the casing body and links rotatably, there is a demand for a structure that is easy to mount, does not easily come off, is simple in configuration, and can be easily reduced in fabrication cost.

With respect to this, a structure having a pair of protrusions projecting from a mounting shaft is known. The mounting shaft is integrally mounted to the bottom of a vertical vane and protrudes. A slot is formed in the mounting surface of the vertical vane to permit the mounting shaft to pass through. In this structure, the protrusions of the mounting shaft of the vertical vane are inserted into the slot and then the vertical vane is rotated 90 degrees. Thus, the longitudinal fringes of the slot are gripped between the protrusions and a jaw portion to hold the vertical vane (for example, disclosed in Japanese Utility Model Unexamined Publication S57(1982)-73539 (FIGS. 2 and 3)).

SUMMARY OF THE INVENTION

However, in the structure where a pair of protrusions project from the mounting shaft as described above, the vertical vane does not pivot stably depending on the direction of force applied to the vane. For example, during an assembly operation, if a force is applied in a direction that is perpendicular to the axial direction of the mounting shaft and to the direction in which the protrusion projects, damage or disengagement tends to easily occur. Furthermore, it is difficult to reduce the fabrication cost. In addition, in the structure as described above, two-dimensional contact between the cylindrical outer surface of the mounting shaft and the circular contour surface of the slot produces a sliding torque. Thereby, the feeling of manipulation is adjusted. The vertical vane and the casing body both of which are molded from resin tend to produce expansion and shrinkage after they are molded. A gap is created between the mounting shaft and the slot. Also, some portions of the mounting shaft and slot are pressed against each other. This deteriorates the feeling of manipulation. Accordingly, in order to improve the accuracy of sliding contact and the feeling of manipulation, there is a problem that the molding die needs to be accurately adjusted in a time-consuming process, thus making it difficult to reduce the fabrication cost.

In view of the foregoing, the present invention has been made. It is an object of the present invention to provide a louver apparatus which has louvers rotating stably, is simple in structure, and facilitates reducing the fabrication cost.

According to the present invention, A louver apparatus comprises a case member, a connecting member, and a louver pivotally secured to the case member, including a shaft portion including a shaft body being in the form of a substantially cylindrical shape, and a head portion being in the form of a substantially regular polygon, and being located at a tip end portion of the shaft body. At least a part of the head portion protruding radially from the shaft body. The connecting member includes an axial hole being in the form of a substantially regular polygon, the head portion being arranged to pass through the axial hole only at predetermined positions, and to be held not to pass through the axial hole at positions other than the predetermined positions.

In this structure, the louver is mounted rotatably to the connecting member by inserting the shaft portion into the axial hole in the bearing portion and rotating the shaft portion a given angle. Under the condition where the louver has been rotatably mounted to the connecting member, the head portion of the shaft portion is placed opposite to the support plate portion of the bearing portion and prevented from coming off. Since the head portion is substantially regularly polygonal in shape, the head portion is opposite to the support plate portion at substantially uniformly spaced three or more locations. If a force is applied from a direction intersecting the axial direction, the louver does not easily disengage but can rotate stably. Furthermore, since the axial hole in the bearing portion is substantially regularly polygonal in shape, the hole is linearly opposite to the substantially cylindrical body of the shaft portion at three or more locations substantially equally spaced from each other. Therefore, it is easy to adjust the sliding resistance when the louver is rotated. Hence, good feeling of manipulation is achieved easily. Additionally, the structure is simple. Each part is not required to have excessively high dimensional accuracy. The fabrication cost can be reduced easily.

A louver apparatus according to a second aspect of the present invention is based on a louver apparatus according to the first aspect and further characterized in the head portion of the shaft portion is in the form of a substantially regular triangle; and the axial hole is in the form of a substantially regular triangle corresponding to the shape of the head portion.

Furthermore, in this structure, it is assured that the range of rotation of the louver can be increased up to almost 120 degrees. This provides a range of operation sufficient for the louver for an ordinary wind direction-adjusting device. Furthermore, the head portion of the shaft portion provides a wide area opposite to the support plate portion of the bearing portion. The head portion is firmly prevented from coming off. Also, stable operation is permitted.

A louver apparatus according to a third aspect of the present invention is based on a louver apparatus according to the first aspect and further characterized in that the shaft body of the shaft portion is in the form of a cylindrical shape; the axial hole includes side portions each confronting the shaft body radially; and each of the side portions of the axial hole is curved radially outwards.

Additionally, in this structure, even in a case where the bearing portion shrinks after fabrication, sufficient radial dimension of the axial hole is secured. Increases in the sliding resistance between the axial hole and the shaft body are suppressed. It is easy to adjust the sliding resistance.

A louver apparatus according to a fourth aspect of the present invention is based on a louver apparatus according to the first aspect of the invention and further characterized in that the louver apparatus further comprises a plurality of louvers; the connecting member includes a plurality of axial holes; and the connecting member is engaged with the louvers to pivot the louvers interlockingly.

In this structure, a louver apparatus that stably rotates the louvers interlockingly by the links is constituted. Since the louvers and links are firmly mounted together, it is easy to perform the assembly operation.

A louver apparatus according to a fifth aspect of the present invention is based on a louver apparatus according to the first aspect of the invention and further characterized in that the connecting member includes a bearing hole; and the louver is interlockingly connected through the bearing hole with a dial or a shutter valve.

In this structure, a louver apparatus in which the louvers are stably and rotatably pivoted to the case body is constituted.

According to the louver apparatus of the present invention, louvers rotate stably. The structure is simple. The fabrication cost can be reduced easily.

BRIEF DESCRIPTION OF THE DRAWINGS

FIGS. 4A-4D illustrate the louver apparatus of FIG. 2.

DETAILED DESCRIPTION OF THE INVENTION

FIGS. 1–4 show a louver apparatus according to a first embodiment of the prevent invention.

Figure 2:
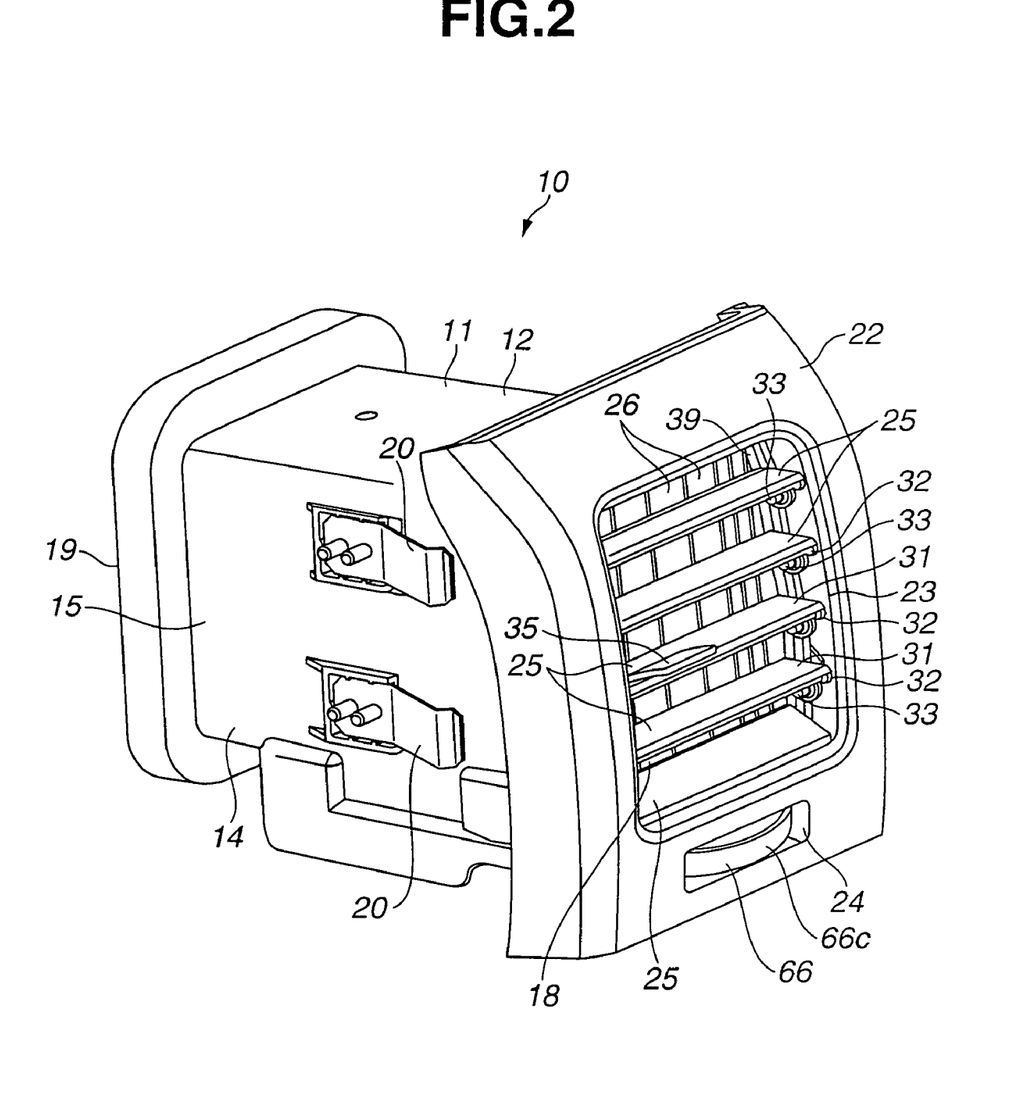
FIG. 2 is a perspective view showing the louver apparatus of FIG. 1A.
Figure 3:
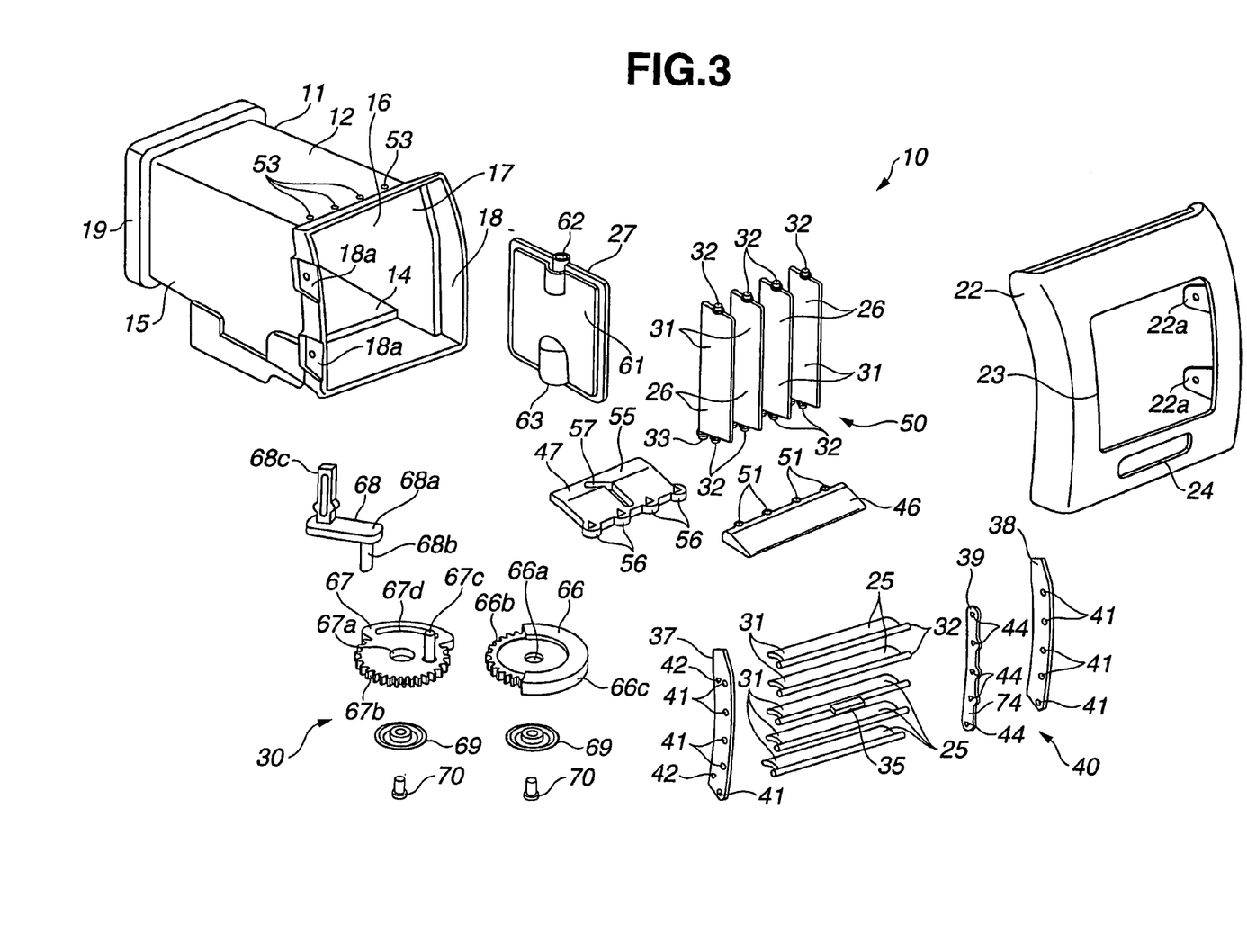
FIG. 3 is an exploded perspective view showing the louver apparatus of FIG. 2.

In FIGS. 2 and 3, a wind direction-adjusting device 10 acts as a louver apparatus. This wind direction-adjusting device 10 is mounted, for example, to an automobile instrument panel and connected to an air conditioner, thus constituting a vehicular air conditioning system for performing air conditioning by blowing air into a passenger compartment. In the following description, the downstream side along which air is blown i.e., the passenger side, is taken, as the front side, and the upstream side of wind is taken as the rear side. Both side directions and up-down direction are described while taking the state in which the louver apparatus is mounted to the vehicle as an example. The wind direction-adjusting device 10 has a case body or case member 11, which is integrally molded from a synthetic resin or the like and assumes a substantially prismatic form. The case body 11 has an upper plate portion 12, a lower plate portion 14, and both side plate portions 15, 16. A wind passage 17 is formed inside the case body 11. A blowout port 18 is formed in the front side of the case body 11. A connection port 19 connected with an air duct of the air conditioner is formed in the rear side of the case body 11. Resiliently deformable clips 20 are bonded to the both side plate portions 15 and 16, respectively, by heat calking or other method.

A finisher 22 is mounted to the front surface of the case body 11. The finisher 22 is made of a synthetic resin, for example, and formed like a frame that covers the front edge of the case body 11. The finisher 22 is provided with an opening 23 in communication with the blowout port 18 and with a slot-like dial manipulation port 24. Two pairs of small mounting members 22a protrude from the rear side, or back surface side, of the finisher 22. The mounting members 22a are brought into engagement with mounting receiving portions 18a formed on both sides of the blowout port 18 in the case body 11, so that the finisher 22 is mounted to the case body 11.

A plurality of lateral louvers 25 (five in the first embodiment) acting as wind direction-adjusting louvers are located inside the case body 11. A plurality of vertical louvers 26 (four in the first embodiment) are disposed as wind direction-adjusting louvers behind the lateral louvers 25. A shutter valve 27 is disposed behind the vertical louvers 26. A drive mechanism 30 for rotating the vertical louvers 26 and shutter valve 27 is disposed inside or outside the case body 11.

Each of the lateral louvers 25 and vertical louvers 26 has a vane portion 31 like a flat plate, a rotating shaft 32 for the vane portion 31, and a link shaft 33 acting as a shaft portion forming a shaft supporting section parallel to the rotating shaft 32.

In the lateral louvers 25, the rotating shafts 32 extend to the both sides of the case body 11 and are positioned up and down in a parallel relation to each other. The rotating shafts 32 protrude cylindrically on both sides substantially along the front fringes. Each of the link shafts 33 is located behind one of the rotating shafts 32 and protrudes to one side. The lateral louver 25 located in the center in the up-down direction is provided with a knob portion 35.

Spacers 37 and 38 for the lateral louvers 25 are mounted at the both sides of the lateral louvers 25. A link 39 for the lateral louvers 25 is engaged and mounted to one side of the lateral louvers 25. The link 39 acts as a connecting member. Thus, a lateral louver subassembly 40 is formed and fitted inside the blowout port 18 of the case body 11. The spacers 37 and 38 for the lateral louvers 25 form flat plates extending vertically. Rotary bearings 41 each assuming the form of a circular hole are formed and arrayed along the longitudinal direction in the up-down direction. Each of the rotary bearings 41 pivotally supports one of the rotating shafts 32 of the lateral louvers 25. Engagement portions 42 engaging the case body 11 are formed on the outer surface. The link 39 for the lateral louvers 25 is narrower than the spacers 37 and 38 for the lateral louvers 25 and forms a flat plate extending in the up-down direction. Bearing portions 44 forming shaft support portions are formed along the longitudinal direction of the links 39 for the lateral louvers 25 and arrayed in the up-down direction. As described later, each of the link shafts 33 is rotatably engaged and supported on one of the bearing portions 44.

Under the condition where the lateral louver subassembly 40 is mounted to the case body 11, the knob portion 35 is pushed up or down to manipulate it. Thus, the lateral louvers 25 interconnected by the link 39 for the lateral louvers 25 are interlockingly pivoted about the rotating shaft 32, and thereby the direction of wind can be varied up and down. In the first embodiment, the range of operation of the lateral louvers 25 is 90 degrees, i.e., 45 degrees on each side.

On the other hand, the vertical louvers 26 are disposed parallel to each other toward both sides such that their longitudinal direction lies in the up-down direction. The rotating shaft 32 protruding up and down is disposed substantially along the center of the widthwise direction. Each of the link shafts 33 forming a shaft supporting section is located behind one of the rotating shafts 32 and protrudes downward.

A spacer 46 for the vertical louvers 26 and a link 47 for the vertical louvers 26 are mounted under the vertical louvers 26 to form a vertical louver subassembly 50. The vertical louver subassembly 50 is located behind the lateral louver subassembly 40 and is fit in the inside of the blowout port 18 in the case body 11. The spacer 46 for the vertical louvers 26 is a flat plate extending to both sides and provided with arrays of rotary bearings 51 longitudinally, i.e., on both sides. Each rotary bearing 51 is in the form of a circular hole, and rotatably supports one end of one of the rotating shafts 32. The rotary bearings 53 are formed in the upper plate portion 12 of the case body 11. Each of rotary bearing 53 is in the form of a circular hole, and rotatably supports the other end of one of the rotating shafts 32.

The link 47 for the vertical louvers 26 has a link plate portion 55 which is molded from a synthetic resin or the like and is the form of a flat plate. Bearing portions 56 are formed along the longitudinal direction at the front end of the link plate portion 55 and arrayed on both sides. A link groove 57 in a given form is formed around the lateral center of the link plate portion 55. In the first embodiment, the link groove 57 extends in the forward and rearward direction as a whole. The front side portion of the link groove 57 extends linearly along the forward and rearward direction. The rear side portion of the link groove 57 is curved. Each of the link shafts 33 is rotatably engaged and supported on one of the bearing portions 56 as described later.

The shutter valve 27 has a shutter body 61 in the form of a flat plate and bearing portions 62, 63 formed in the central portions of the top and bottom of the shutter body 61. The upper bearing portion 62 is in the form of a circular hole, and is rotatably mounted in a rotating shaft (not shown) protruding inwardly from the upper plate portion 12 of the case body 11. Meanwhile, the lower bearing portion 63 is in the form of a rectangular hole, and is disposed opposite to a through hole (not shown) formed in the lower plate portion 14 of the case body 11.

The drive mechanism 30 is composed of a dial 66, a valve link 67, a valve pin 68, a plurality of soft brushings 69, and a plurality of screws 70 (that are mounting members). The dial 66 is a manipulation dial made of a synthetic resin, for example, and is in the form of a disk shape. The dial 66 is formed with an axial hole 66a at the center thereof. A toothed portion of gear portion 66b is formed in a part of the outer periphery of the dial 66. A manipulation portion 66c is formed in the other portion of the outer periphery of the dial 66. The dial 66 is supported on the bottom surface side of the lower plate portion 14 of the case body 11 by the bushings 69 and screws 70 so that it can pivot with appropriate sliding resistance, i.e., torque. When the dial 66 has been mounted to the case body 11, a part of the manipulation portion 66c of the dial 66 protrudes forward from the dial manipulation port 24 in the finisher 22.

The valve link 67 is molded from a synthetic resin, for example, and is in the form of a disk shape. The valve link 67 is formed with an axial hole 67a at the center thereof. A toothed portion or gear portion 67b is formed in a part of the outer periphery of the valve link 67. A link pin portion 67c protrudes from a position between the axial hole 67a and the outer periphery of the valve link 67 along the axial direction. An arcuate link groove portion 67d is formed along the other portion of the outer periphery of the valve link 67. The valve link 67 is supported on the bottom surface side of the lower plate portion 14 of the case body 11 by the bushings 69 and screws 70 such that the link can be pivoted with appropriate sliding resistance, i.e., torque. When the valve link has been mounted to the case body 11, the toothed portion 67b is in mesh with the toothed portion 66b of the dial 66. The link pin portion 67c is moveably inserted in the link groove 57 in the link 47 for the vertical louvers 26.

Furthermore, the valve pin 68 is molded from a synthetic resin, for example, and has a base portion 68a in the form of a horizontal flat plate, a shutter link pin 68b protruding downward from one end portion of the base portion 68a, and a substantially prismatic shutter-connecting pin 68c protruding upward from the other end portion of the base portion 68a. The valve pin 68 is supported on the bottom surface side of the lower plate portion 14 of the case body 11 by the bushings 69 and screws 70 so that the valve pin 68 can be rotated with suitable sliding resistance, i.e., torque. When the valve pin 68 has been mounted to the case body 11, the shutter-connecting pin 68c is inserted into a through hole (not shown) formed in the lower plate portion 14 of the case body 11 and is fit in the bearing portion 63 in the shutter valve 27 to lock the valve pin 68 against rotation. Also, the shutter link pin 68b is movable inserted into the link groove portion 67d in the valve link 67 and built in the drive mechanism 30.

The valve link 67 is pivoted by rotating the manipulation portion 66c of the dial 66 right and left. As the valve link 67 turns, each of the vertical louvers 26 interlockingly pivots about one of the rotating shafts 32. The direction of wind can be varied to both sides, i.e., right and left. The shutter valve 27 is rotated about the bearing portions 62 and 63, thus opening and closing the wind passage 17. That is, within the given range of manipulation in which the dial 66 rotates, the shutter link pin 68b moves in the link groove portion 67d relative to it, and thereby open state is maintained without moving the valve pin 68, i.e., shutter valve 27. The link pin portion 67c located on the straight portion of the link groove 57 pushes the link 47 for the vertical louvers, moving the link 47 right and left. Each of the vertical louvers 26 interconnected by the vertical louver link 47 are interlockingly pivoted about one of the rotating shafts 32. The direction of wind is varied to both sides, i.e., right and left. In the first embodiment, the range of operation of the vertical louvers 26 is 90 degrees, i.e., 45 degrees on each side. If the dial 66 is rotated further, the link pin portion 67c moves relative to the curved portion of the link groove 57 without moving the link 47 for the vertical louvers 26. An end portion of the link groove portion 67d pushes the shutter link pin 68b, rotating the shutter valve 27 so as to close it. The louvers 32 are interlockingly connected through the bearing holes 56 with the dial 66 and the shutter valve 27.

In assembling the wind-direction adjusting device 10, the link shafts 33 of the vertical louvers 26 are first fit in the link 47 for the vertical louvers 26, forming a first vertical louver subassembly. The spacer 46 for the vertical louvers 26 is fit over the rotating shaft 32 of the vertical louvers 26 of the first vertical louver assembly. Thus, the vertical louver subassembly 50 is constituted. The vertical louver subassembly 50 is fitly mounted into the case body 11. Then, the valve link 67 and valve pin 68 are mounted to the bottom surface side of the case body 11, using the bushings 69 and screws 70. The shutter valve 27 is also mounted. Subsequently, the toothed portion 66b of the dial 66 and the toothed portion 67b of the valve link 67 are brought into mesh with each other and mounted to the bottom surface side of the case body 11, using the bushings 69 and screws 70. Then, the link 39 for the lateral louvers 25 is fit over one side of the lateral louvers 25. The spacers 37 and 38 for the lateral louvers 25 are mounted to the both sides of the lateral louvers 25, thus forming the lateral louver subassembly 40. The lateral louver subassembly 40 is fitly mounted inside the case body 11. Furthermore, the finisher 22 is mounted to the case body 11, forming the wind direction-adjusting device 10.

In the first embodiment, the case body 11 and links 39, 47 are made of ABS (acrylonitrile-butadiene-styrene copolymer). The louvers 25 and 26 are made of PPC (a composite material consisting of polypropylene to which an additive has been added). The drive mechanism 30 including the dial 66 or the like is made of polyacetal. The materials of these components are not limited to these examples. They may also be made of other resin or material.

Figure 1A:
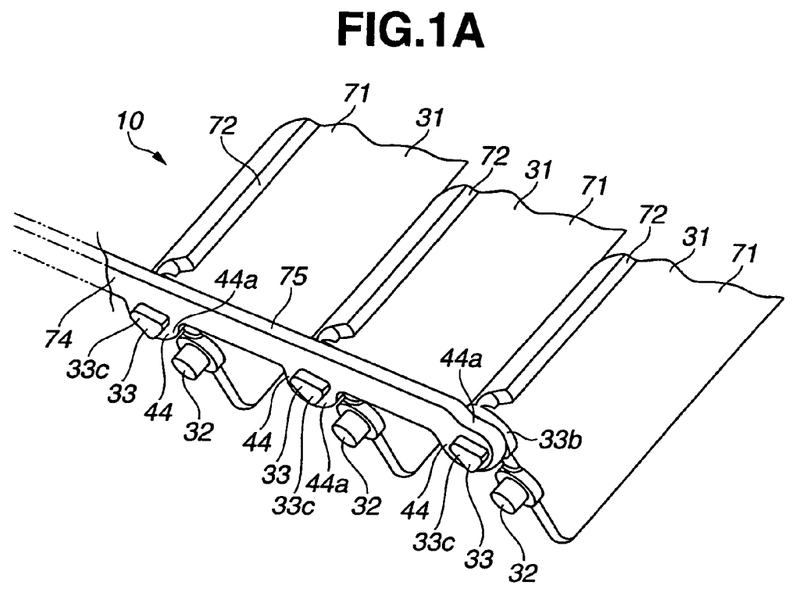
FIG. 1A is a perspective view showing a louver apparatus in which louvers have been combined with a link, according to a first embodiment of the present invention.
Figure 1B:
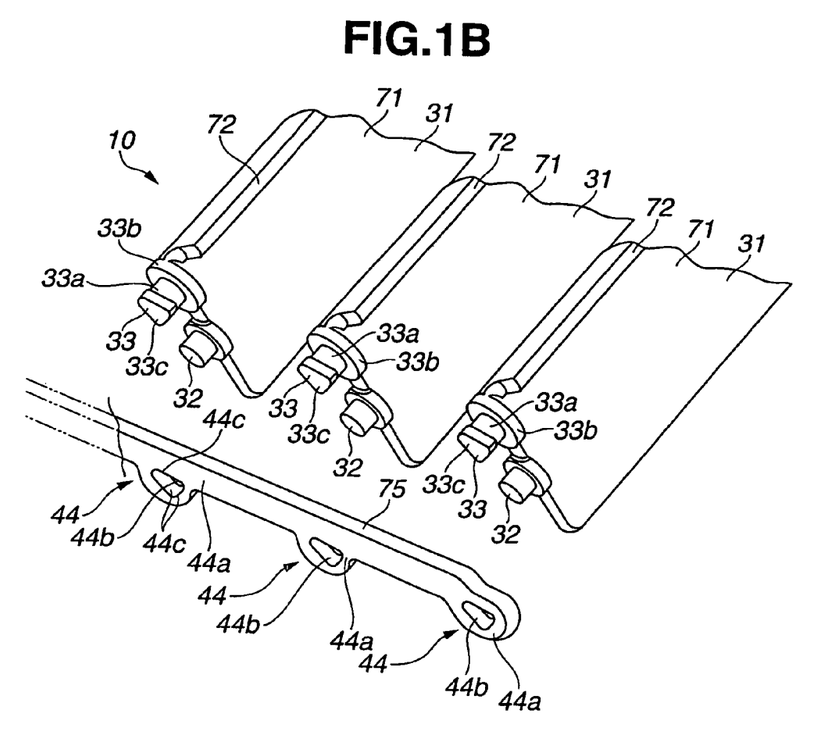
FIG. 1B is a perspective view showing the louver apparatus of FIG. 1A, in which the louvers have been disengaged from the links.

A structure for connecting the louvers 25 and 26 to the links 39 and 47 acting as connecting members described by referring mainly to FIGS. 1 and 4. In this description, louvers 71 are used. As shown in FIG. 1, each of the rotating shafts 32 protrudes from the widthwise center of one of the vane portions 31. The link shaft 33 acting as a shaft portion parallel to the rotating shaft 32 is formed near one lateral end of the louver 71. Each of the louvers 71 further includes a curved portion 72 along one lateral end of the vane portion 31. The link 74 acting as a connecting member has a link body portion 75 in the form of a narrow, flat plate and bearing portions 44 formed in the link body portion 75 at regular intervals.

The link shaft 33 of the louver 71 has a cylindrical shaft body 33a, a seat portion 33b formed on the vane portion 31 side of the shaft body 33a, i.e., on the base end side, and a protruding head portion 33c formed at the front end of the shaft body 33a. The head portion 33c is a flat plate shaped like a substantially regular polygon. These portions 33a, 33b, and 33c are integrally formed. In the present embodiment, the head portion 33c is shaped like a flat plate assuming a substantially regularly triangular form as viewed from a direction along the axial direction of the shaft body 33a and protrudes more radially than the shaft body 33a. That is, the radial dimension of the head portion 33c is enlarged. The seat portion 33b is shaped like a disk coaxial with the shaft body 33a and protrudes more radially than the shaft body 33a and head portion 33c. That is, the radial dimension of the seat portion 33b is enlarged.

On the other hand, each of the bearing portions 44 of the link 74 has a support plate portion 44a formed to protrude to one side from the link body portion 75, and axial hole 44b extending through the support plate portion 44a. Each axial hole 44b is in the form of a substantially regular polygon. Each axial hole 44b has three sides 44c similar in shape with the head portion 33c, and is in the form of a substantially regular polygon. Furthermore, in the first embodiment, each side 44c has an intermediate portion that is curved so as to protrude slightly outwardly. The inside diameter dimension that is twice the dimension from the center of each axial hole 44b to each side 44c is set substantially equal to the outside diameter dimension of the shaft body 33a.

The radial dimension of the head portion 33c is greater than the radial dimension of each axial hole 44b by 0.1 mm. That is, in terms of virtual diameter, the former dimension is formed to be greater than the latter dimension by 0.2 mm.

Figure 4A:
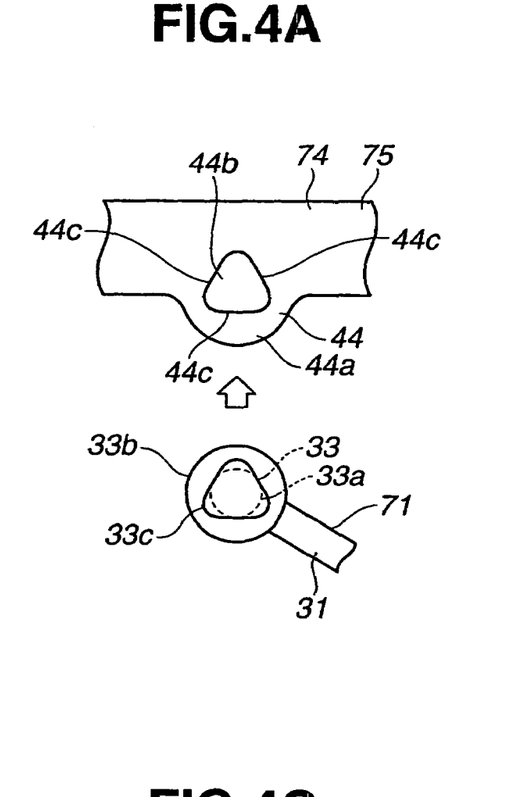
FIG. 4A is a front elevation, showing the state in which the louvers are not yet combined with the links.
Figure 4B:
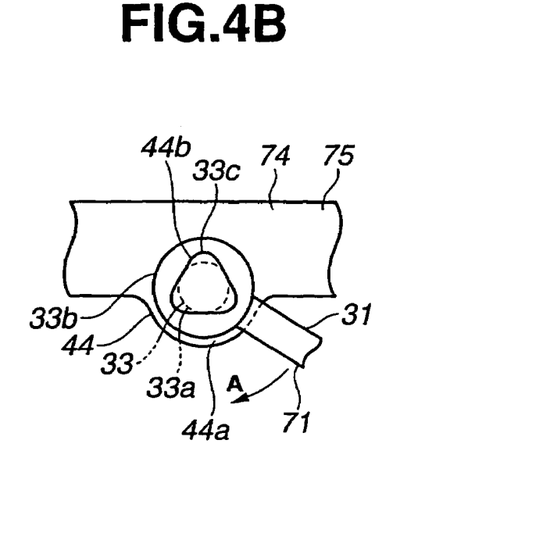
FIG. 4B is a front elevation showing the state in which the louvers have been combined with the links.
Figure 4C:
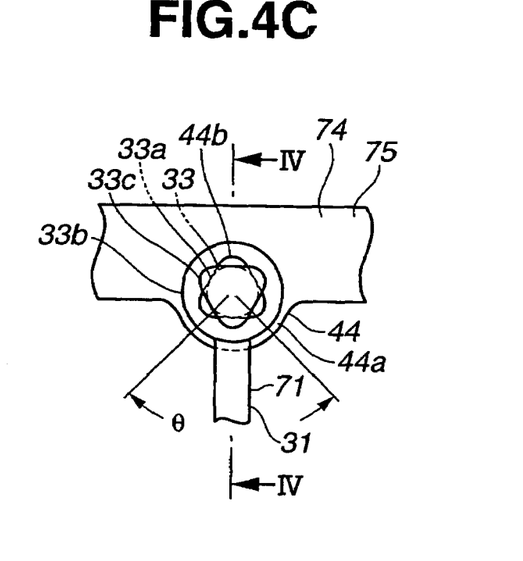
FIG. 4C is a front elevation showing the state in which the louvers have been combined with the links.
Figure 4D:
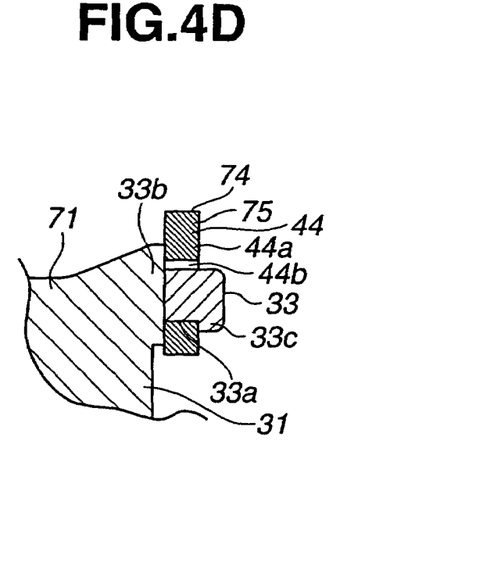
FIG. 4D is a cross-sectional view taken on line IV-IV of FIG. 4C.

As shown in FIG. 4A, the head portion 33c and axial hole 44b are aligned in rotary position. Under this condition, as shown in FIG. 4B, the head portion 33c is inserted into the axial hole 44b by press fit so as to extend through it. The shaft body 33a is inserted in the axial hole 44b. Under this condition, each louver 71 is rotated as indicated by the arrow A. As shown in FIGS. 4C and 4D, the head portion 33c is placed opposite to one surface of the support plate portion 44a. The seat portion 33b also faces the other surface of the support plate portion 44a. Each louver 71 can stably rotate while the support plate portion 44a is held between the head portion 33c and seat portion 33b. Under this condition, each louver 71 is prevented from coming off and held there.

In this structure where the head portion 33c and axial hole 44b in regular triangular form are formed, the head portion 33c reaches an engagable/disengagable position at every 120 degrees. After the head portion 33c has been inserted in the axial hole 44b and made to extend through it, if the head portion is rotated 5 degrees, for example, the head portion 33c overlaps the support plate portion 44a at the fringe of the axial hole 44b. This configuration acts as disengagement-preventing means. Accordingly, in the present embodiment where the range of rotation of the louver 71 is 90 degrees, disengagement can be reliably prevented in the range of rotation θ of the louver 71 as shown in FIG. 4C. Note that the angles of rotation at which the disengagement-preventing function is assured differs according to the dimensions of the head portion 33c and axial hole 44b.

In a condition in which the link shaft 33 has been fitted in the bearing portion 44, the shaft body 33a linearly abuts against each side 44c of the axial hole 44b and is fitted over it. Consequently, appropriate sliding resistance, i.e., manipulation torque, is achieved.

In this way, according to the present embodiment, a structure where the subassemblies 40 and 50 are formed is offered. The subassemblies are fabricated by bringing the plural louvers 71 (25, 26) into engagement with the links 74 (39, 47) connecting the louvers 71. This structure has the head portion 33c swelling from the shaft body 33a of each louver 71. Each of the head portion 33c of each louver 71 and axial hole 44b in the link 74 is shaped as a regular polygon. Therefore, the head portion 33c of the louver 71 extends through the axial hole 44b. Under this condition, the head portion 33c and the support plate portions 44a around the axial hole 44b overlap with each other in two dimensions at three or more locations. The louver 71 can be certainly prevented from coming off the link 74. Accordingly, if stress is concentrated at the fitting portion between the link shaft 33 and the bearing portion 44 when the louvers are built into the wind direction-adjusting device 10 or the subassemblies 40 and 50 are transported under the condition where the subassemblies have been achieved by combining the louvers 71 and links 74 as well as after they are built into the wind direction-adjusting device 10, the fitting portion does not rattle. Disengagement of the link shaft 33 of the louver 71 is prevented. Treatment is facilitated. A structure in which the louvers 71 and links 74 are adapted to be combined and used can be offered.

Furthermore, since each of the head portion 33c of the louver 71 and axial hole 44b in the link 74 is shaped as a regular polygon, the head portion 33c overlaps three or more fringe portions of the axial hole 44b. The directional stability of the link shaft 33 is improved compared with a structure using a pair of protrusions. Therefore, when the dial 66 is manipulated to rotate the louver 71, for example, even if a load such as twist is applied to the link 74, the link shaft 33 of the louver 71 can be easily prevented from coming off or getting damaged.

The shaft body 33a of the link shaft 33 touches the inner surfaces of all the sides 44c of the axial hole 44b in the bearing portion 44 not two-dimensionally but linearly. Therefore, it is unlikely that excessive sliding resistance, i.e., manipulation torque, is applied. The louvers 71 can be manipulated smoothly. The feeling of manipulation can be improved.

Additionally, the position at which the shaft body 33a and axial hole 44b abut with each other and the position at which the head portion 33c and support plate portion 44a overlap each other are close to each other and so the louvers 71 and link 74 are fitted together more stably and reliably. Disengagement of the louvers 71 can be prevented.

Further, the shaft body 33a of the link shaft 33 touches the inner surfaces of all the sides 44c of the axial hole 44b in the bearing portion 44 not two-dimensionally but linearly at three locations. Linear contact is attained, so to speak. Therefore, the sliding resistance, i.e., manipulation torque, can be reduced and adjusted easily with a simpler structure than a structure in which a cylindrical shaft portion is made to make a sliding contact with a circular axial hole two-dimensionally and the torque is managed. The operation to adjust the molding die accurately can be performed in a reduced time. The fabrication cost can be curtailed.

The louvers 71 and link 74 fit together more stably and reliably. Disengagement of the louvers 71 can be prevented. The subassemblies 40 and 50 can be handled with greater ease. This permits automated mechanized assembly of the wind direction-adjusting device 10. Hence, the fabrication cost can be decreased easily.

Since the head portion 33c of the louver 71 and the axial hole 44b in the link 74 are each shaped as a regular triangle, the engagement can be maintained in a wide range of 120 degrees. This is sufficiently wider than the range of operation (i.e., from 30 degrees to 90 degrees, that is, from 15 degrees to 45 degrees on one side) of the louvers of a general wind direction-adjusting device. Therefore, during the pivotal movement, the head portion is prevented from coming off and can be used practically. In addition, the three vertices are uniformly spaced from each other around the axial hole 44b. The head portion 33c provides a maximum area overlapping the support plate portion 44a. That is, it provides an area greater than any other regular polygon. Consequently, disengagement of the link shafts 33 of the louvers 71 can be prevented certainly.

With respect to the three sides 44c connecting the vertices of the axial hole 44b shaped like a regular polygon, at least the portions in abutment with the shaft body 33a are shaped curvilinearly outwardly (e.g., arcs connecting the vertices) and so if the link 74 made of a synthetic resin, for example, shrinks and the axial hole 44b tries to decrease, shrinkage toward the inside axial hole 44b is suppressed. The inside diameter dimension of the axial hole 44b can be maintained stably. Accordingly, generation of unwanted sliding resistance can be suppressed. The manipulation torque can be adjusted easily. On the other hand, if the shaft body 33a expands and the area of contact between the shaft body 33a and axial hole 44b increases, increase in the contact area can be absorbed, because at least the portions of the sides 44c abutting against the shaft body 33a are curved outwardly (e.g., formed like arcs connecting the vertices). Thereby, the louvers 71 can be manipulated smoothly.

Under the condition where the link shaft 33 is mounted to the bearing portion 44, the axial hole 44b is covered by the seat portion 33b of the link shaft 33 and so it is impossible to see it. Consequently, the appearance can be improved. The range in which the louver apparatus including the wind direction-adjusting device 10 is installed can be widened. The generality can be enhanced.

In the above described embodiment, the structures of the portions of the head portion 33c and axial hole 44b each shaped like a regular polygon have been described, the portions being used to mount the louvers 25 and 26 to the links 39 and 47. The invention is not limited to these structures. The invention can also be applied to other shaft supporting section such as rotating shaft of louver.

Figure 5:
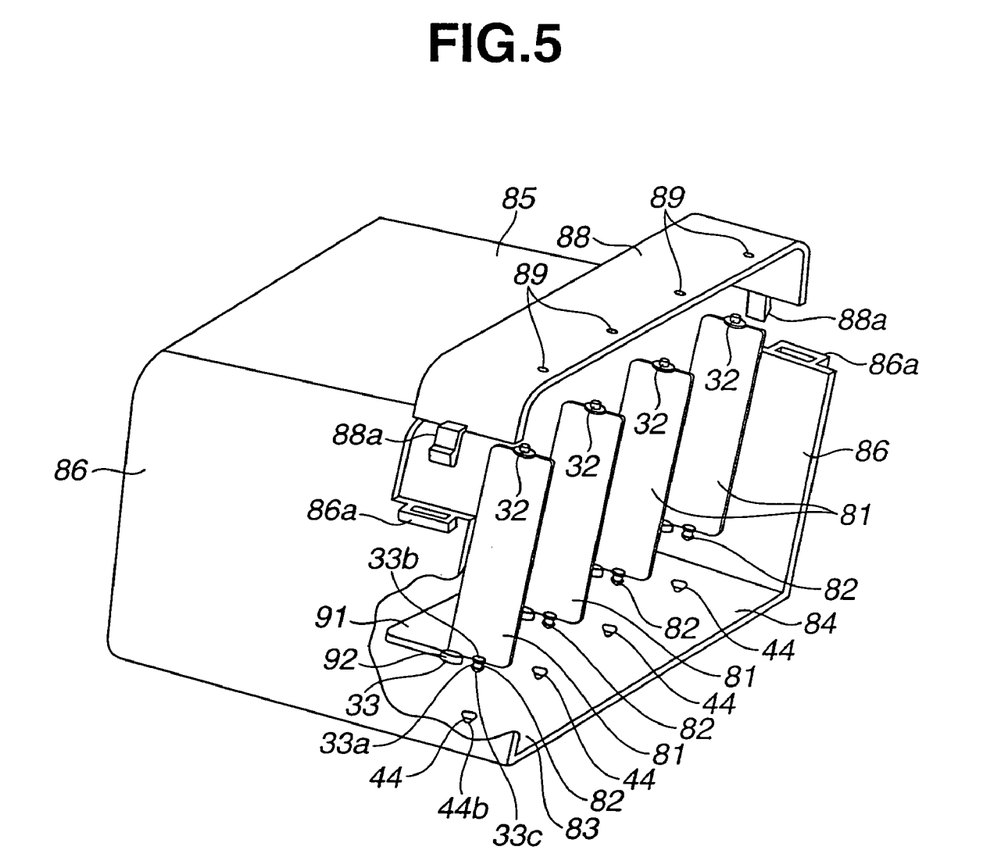
FIG. 5 is a partially cutaway, exploded perspective view showing a louver apparatus according to a second embodiment of the present invention.

For example, as shown in FIG. 5, one of the rotating shafts 32 of the louvers 81 that are vertical louvers can be taken as the rotating shaft 82 acting as a shaft portion. That is, in this structure, the lower rotating shaft 82 has a cylindrically shaped shaft body 33a, a seat portion 33b formed on the base-end side of the shaft body 33a, and a head portion 33c in the form of a regular polygon (in the present embodiment, a regular or equilateral triangle) formed at the front end of the shaft body 33a, in the same way as in the structure shown in FIG. 1. On the other hand, the bearing portion 44 having an axial hole 44b in the form of a regular polygon (in the present embodiment, in the form of a regular triangle) in a corresponding manner to each louver 81 is formed in the lower plate portion 84 constituting the support plate portion of the case body 83 as acting as a connecting member. The portions of the upper plate portion 85 of the case body 83 and both side plate portions 86 which are opposite to the bearing portion 44 are partially cut out. A cover 88 is mounted in this cutout. The cover 88 has engaging pawls 88a at both sides. The engaging pawls 88a are mounted to the case body 83 by bringing the pawls into engagement with engaging receiving pawls 86a from above, the pawls 86a being formed on both side plate portions 86. A rotary bearing 89 in the form of a circular hole is formed in the cover 88 in an opposite relation to the bearing portion 44. A receiving portion 92 of a link 91 is rotatably connected to the link shaft 33 protruding from the lower rear end of the louver 81. The link shaft 33 can be shaped as a simple cylinder. Furthermore, it may be constructed similarly to the structure shown in FIG. 1.

In the structure shown in FIG. 5, louvers 81 can be stably mounted to the case body 83 by inserting the rotating shaft 82 of the louvers 81 which have been previously connected to the link 91 into the respective axial holes 44b in the bearing portions 44 and rotating the shafts 82. The same advantages as produced by the structure shown in FIG. 1 can be obtained.

That is, a subassembly in which the plural louvers 81 are fitly and stably mounted to the case body 83 so as to be rotatable can be constructed. Transpotation of the subassembly and mounting to other part are facilitated. The fabrication cost can be reduced. Furthermore, the head portion 33c of the rotating shaft 82 of each louver 81 overlaps the lower plate portion 84 forming the support plate portion at three or more locations. When stress is received, stable rotation without rattling and prevention of disengagement can be achieved.

Furthermore, in the same way as the structure shown in FIG. 1, the shaft body 33a of the rotating shaft 82 contacts the inner surfaces of all the sides of the axial hole 44b in the bearing portion 44 not two-dimensionally but linearly. Therefore, excessive application of sliding resistance, i.e., manipulation torque, is prevented. The louvers 81 can be manipulated smoothly. The feeling of manipulation can be improved. Since the position where the shaft body 33a and axial hole 44b are in engagement with each other and the position where the head portion 33c and the lower plate portion 84 overlap each other are close to each other, the louvers 81 and the case body 83 fit together more stably and reliably. The louvers 81 can be prevented from coming off. Furthermore, the shaft body 33a touches the inner surfaces of all the sides of the axial hole 44b not two-dimensionally but linearly at three locations. Consequently, the structure is simpler, and the sliding resistance (and hence the manipulation torque) can be reduced and adjusted more easily than in the structure in which a cylindrical shaft is brought into a sliding contact with a circular axial hole two-dimensionally and the torque is managed. The operation for accurately adjusting the molding die can be shortened. The fabrication cost can be reduced.

In the above-described embodiments, the head portion 33c and the axial hole 44b are each made as a regular triangle. The invention is not limited to this shape. The shape can be a regular polygon such as regular square, regular pentagon, and regular hexagon according to the range of operation of the wind direction-adjusting device, i.e., the range of pivotal movement of the louvers.

Furthermore, in the above-described embodiments, the shaft portion is formed on the louver side. The bearing portion is formed in the counterpart member to which each louver is mounted. The invention is not limited to this structure. A bearing portion having an axial hole may be formed on the louver side. A shaft portion may be formed in the counterpart member.

The present invention can be applied to a louver apparatus equipped with louvers mounted in the blowout port of an air conditioner for an automobile or the like. The invention is especially adapted for a structure in which louvers and links are combined.

This application is based on a prior Japanese Patent Application No. 2004-194597. The entire contents of the Japanese Patent Application No. 2004-194597 with a filing date of Jun. 30, 2004 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A louver apparatus comprising:
   a case member;
   a louver pivotally secured to the case member, including a shaft portion including a shaft body being in the form of a substantially cylindrical shape, and a head portion being in the form of a substantially regular polygon, and being located at a tip end portion of the shaft body, at least a part of the head portion protruding radially from the shaft body; and
   a connecting member including an axial hole being in the form of a substantially regular polygon, the head portion being arranged to pass through the axial hole only in predetermined positions, and to be held not to pass through the axial hole in positions other than the predetermined positions.

2. The louver apparatus as claimed in claim 1, wherein the head portion of the shaft portion is in the form of a substantially regular triangle; and the axial hole is in the form of a substantially regular triangle corresponding to the shape of the head portion.

3. The louver apparatus as claimed in claim 1, wherein the shaft body of the shaft portion is in the form of a cylindrical shape; the axial hole includes side portions each confronting the shaft body radially; and each of the side portions of the axial hole is curved radially outwards.

4. The louver apparatus as claimed in claim 1, wherein the louver apparatus further comprises a plurality of louvers; the connecting member includes a plurality of axial holes; and the connecting member is engaged with the louvers to pivot the louvers interlockingly.

5. The louver apparatus as claimed in claim 1, wherein the connecting member includes a bearing hole; and the louver is interlockingly connected through the bearing hole with a dial or a shutter valve.

* * * * *